Figure 1:
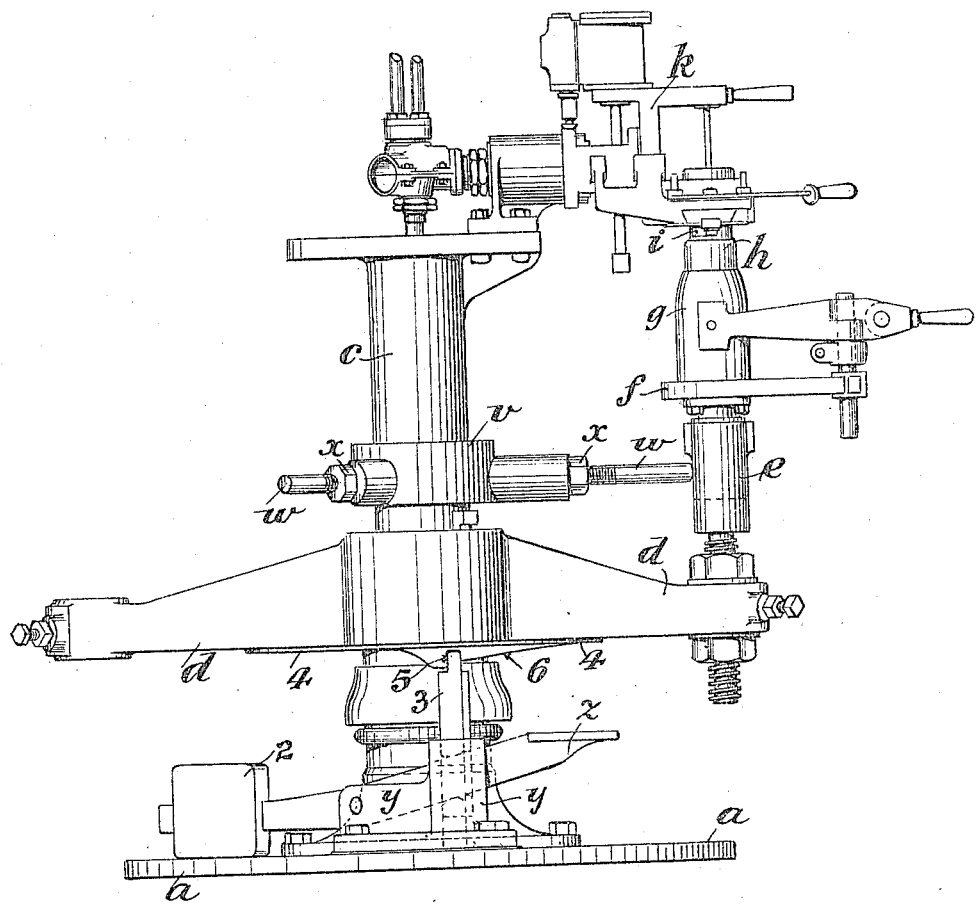

J. H. STEELE.
MACHINE FOR THE MANUFACTURE OF GLASS BOTTLES, JARS, AND THE LIKE.
APPLICATION FILED MAR. 29, 1916.

1,234,406.

Patented July 24, 1917.
2 SHEETS—SHEET 1.

Inventor.
James Henderson Steele
Per Ferdinand Bosshardt
Attorney.

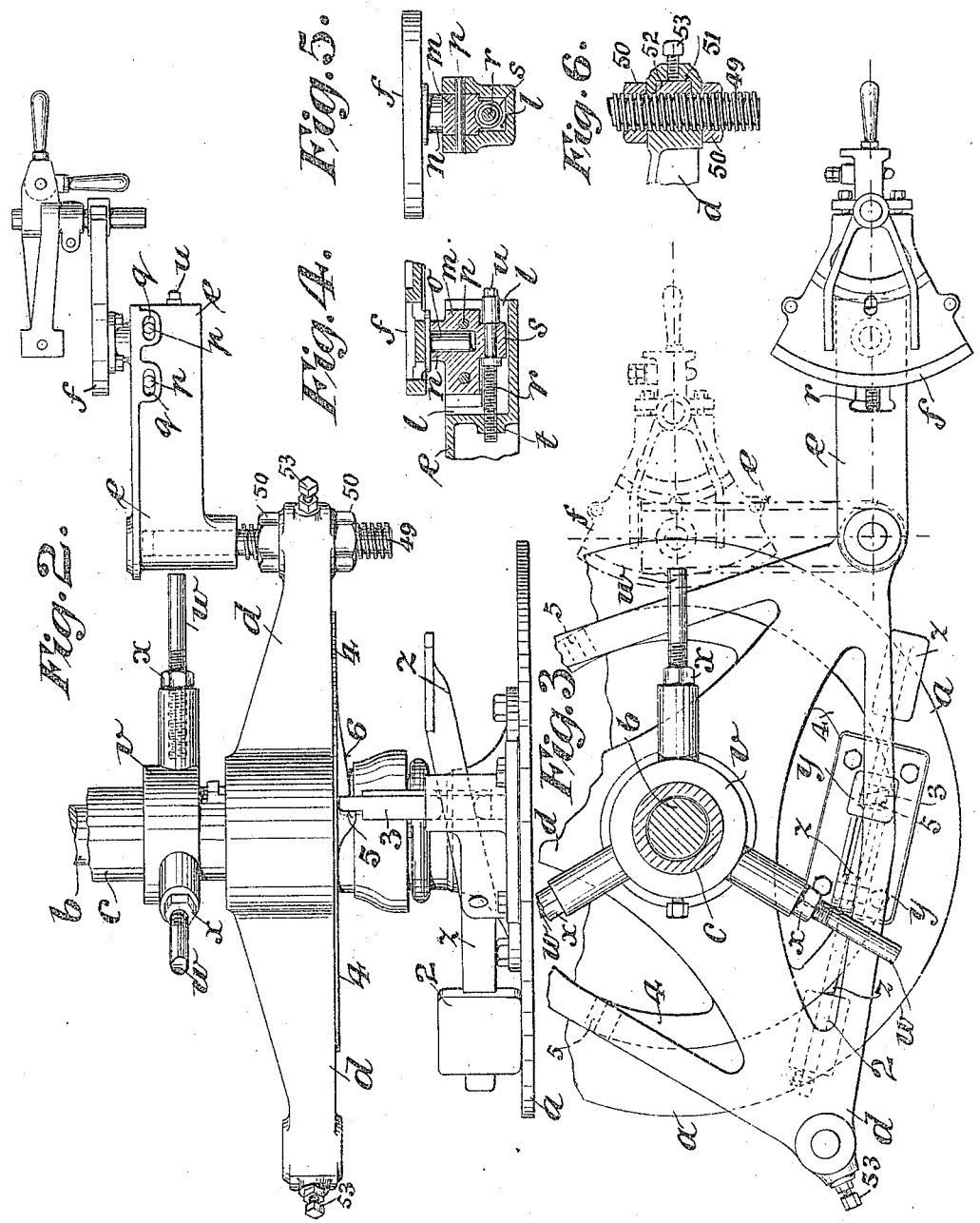

UNITED STATES PATENT OFFICE.

JAMES HENDERSON STEELE, OF PENDLETON, ENGLAND.

MACHINE FOR THE MANUFACTURE OF GLASS BOTTLES, JARS, AND THE LIKE.

1,234,406.            Specification of Letters Patent.      Patented July 24, 1917.

Application filed March 29, 1916. Serial No. 87,478.

*To all whom it may concern:*

Be it known that I, JAMES HENDERSON STEELE, a subject of the King of Great Britain, residing at Pendleton, in the county of Lancaster, England, have invented new and useful Improvements in Machines for the Manufacture of Glass Bottles, Jars, and the like, of which the following is a specification.

This invention relates to that type of machines for the manufacture of glass bottles, jars and the like which generally comprise a pillar carrying an intermittently rotatable sleeve, a number of arms on the said sleeve, each having pivotally connected thereto an arm carrying a table, a finishing mold supported by each of the said tables, a corresponding number of parison and ring or neck molds carried by a turnover-bracket mounted on the said sleeve, the said tables being rendered horizontally and vertically adjustable and means provided for arresting the said table with finishing mold in proper alinement with the ring or neck mold.

The object of the said invention is to insure a perfect contact and instantaneous concentric alinement of the finishing mold with the ring or neck mold when the finishing mold is brought under the ring or neck mold for coöperation therewith.

I attain this object by the mechanism illustrated in the accompanying two sheets of drawings, in which—

Figure 1 is an elevation of a machine provided with my improvements, Fig. 2 is an elevation and Fig. 3 a plan on an enlarged scale of the lower part of the machine, and Figs. 4 and 5 are a detached sectional side view and a detached sectional end view of the table and arm carrying the same. Fig. 6 is a detached sectional side view of the connecting means between each arm on the rotatable sleeve and each arm carrying a table.

Similar letters refer to similar parts throughout the several views.

Referring to the figures generally, *a* is the base or foundation plate of the machine, *b* the pillar, *c* the sleeve thereon, *d* are the arms of the sleeve, *e* the swing arms pivoted to the sleeve arms *d*, and *f* the table which carries the finishing mold *g*. *h* is the parison mold and *i* the ring or neck mold, mounted in the turnover-bracket *k*.

The finishing mold table is rendered horizontally adjustable on the swing arm in a line radial with the swing arm stud and intersecting the circular line of movement of the swing arm. In order to permit the said adjustment, the free end of the swing arm *e* is formed with a cavity *l*, see more particularly Figs. 4 and 5, in which is situated a slide *m* formed to serve as a socket *n* for the pivot *o* of the table *f*. The slide *m* is connected with the arm *e* by two pins *p* adapted to slide in slots *q* formed in each side of the arm *e*. The slide *m* is rendered longitudinally adjustable in the arm *e* by means of a screw-threaded spindle *r* mounted in the boss *s* on the slide *m* and engaging in a nut *t* formed in the inner end of the cavity *l*. The outer end of the screw-threaded spindle *r* has a hexagonal or the like head *u* adapted to receive a key or handle by means of which it can be readily turned.

The said slide and spindle permit of an extremely fine and thus very accurate horizontal adjustment of the finishing mold table and thereby insure the wall of the bottles or the like being formed uniform in thickness.

In order to insure that the finishing mold shall always come instantaneously into exact alinement when once the above adjustment has been made and the machine is in use, there is provided on the sleeve *c* a vertically adjustable collar *v* carrying outwardly extending longitudinally adjustable arms *w*, against which the arms *e* carrying the finishing mold table *f* abut when the arms are swung in, with point of contact radial with the sleeve center, as shown in dotted lines Fig. 3. The arms *w* are rendered longitudinally adjustable by being screw-threaded into the collar *v* and furnished with a lock nut *x*.

For the same purpose, there is secured to the foundation *a*, a bracket *y* having pivoted thereto a foot pedal *z* furnished with a counter weight 2. In the bracket *y*, a vertically movable bolt 3 is suitably guided and linked to the pedal *z*. The underside of the arms *d* is formed with an annular rim 4 situated a considerable distance away from the center of rotation of the arms *d* and in line with the bolt 3. Between each two arms *d* the rim 4 has a notch 5 which when the arms *d* have arrived in the desired position comes into register with the bolt 3 and into which the bolt 3 is forced by the weight 2, thereby stopping and locking the arms *d* in the proper position. The arms *d* are released by momentarily depressing the foot pedal *z*.

In order to brake the arms *d* before they are stopped and thereby prevent shocks to the said arms, each notch 5 has in front an incline 6 on which the bolt 3 rides a short time before it enters the notch 5. This incline causes the pedal *z* to be sufficiently depressed to raise the weighted end thereof and the bolt 3 to be thereby pressed against the incline and act as a brake for the arms *d*.

The pedal weight 2 is adapted to rest upon the foundation plate *a* during the rotation of the sleeve and engagement of the bolt 3 and the latter is made of such a length that its end will remain out of contact with the rim 4 between each notch and next following incline and thus allow of rotating the arms freely.

In order to insure that the top of the finishing mold comes into contact with the ring or neck mold, each arm *e* is mounted on a stud 49 the lower end of which is screw-threaded, see Figs. 1, 2 and 6, and is provided with nuts 50 adapted to be screwed against the boss on the end of the arm *d*. The boss has a cavity 51 in which is employed a metal pad 52 adapted to be forced against the screw-threaded part of the pivot 49 by means of a set screw 53, whereby the stud 49 is prevented from rotating when set in the required vertical position.

I claim:

1. In a machine of the type hereinbefore referred to for the manufacture of glass bottles, jars and the like, a rotatable sleeve, arms carried by the said sleeve, a rotary and laterally stationary stud secured in each of the said sleeve arms, a swing arm pivoted to each of the said studs, a finishing mold table on each of the said swing arms and means for horizontally adjusting the said table on the said swing arm in a line radial with the said stud and intersecting the horizontal circular line of movement of the said swing arm, for the hereinbefore specified purpose.

2. In a machine of the type hereinbefore referred to for the manufacture of glass bottles, jars and the like, a rotatable sleeve, arms carried by the said sleeve, a rotary and laterally stationary stud secured in each of the said sleeve arms, a swing arm pivoted to each of the said studs, a finishing mold table on each of the said swing arms and means for horizontally adjusting the said table on the said swing arm in a line radial with the said stud and intersecting the horizontal circular line of movement of the said swing arm, the said means comprising a cavity in the said sleeve arm, a screw-threaded spindle and a slide in the said cavity carrying the said table, for the hereinbefore specified purpose.

3. In a machine of the type hereinbefore referred to for the manufacture of glass bottles, jars and the like, a rotatable sleeve, arms carried by the said sleeve, a rotary and laterally stationary stud in each of the said sleeve arms and a swing arm pivoted to the upper end of the said stud, a finishing mold table on the said swing arm, a screw-thread on the lower end of the said stud carrying two nuts to bear against the said sleeve arm for the vertical adjustment of the said stud together with the said swing arm and table and means in the said sleeve arm for clamping the said stud in position after having been vertically set, for the hereinbefore specified purpose.

4. In a machine of the type hereinbefore referred to for the manufacture of glass bottles, jars and the like, a rotatable sleeve, arms carried by the said sleeve, a rotary and laterally stationary stud secured in each of the said sleeve arms, a swing arm pivoted to each of the said studs, and radially extending and vertically adjustable means on the said sleeve for stopping each swing arm with point of contact lineal with the center of the said sleeve and neck mold, for the hereinbefore specified purpose.

5. In a machine of the type hereinbefore referred to for the manufacture of glass bottles, jars and the like, a rotatable sleeve, arms carried by the said sleeve, a rotary and laterally stationary stud secured in each of the said sleeve arms, a swing arm pivoted to each of the said studs, radially extending and vertically adjustable means on the said sleeve for stopping each swing arm with point of contact lineal with the center of the said sleeve and neck mold, the said means comprising a collar vertically and rotatably adjustable on the said sleeve and radially extending longitudinally adjustable rods, for the hereinbefore specified purpose.

6. In a machine of the type hereinbefore referred to for the manufacture of glass bottles, jars and the like, a rotatable sleeve, arms carried by the said sleeve, a rotary and laterally stationary stud secured in each of the said sleeve arms, a swing arm pivoted to each of the said studs, a finishing mold table on each of the said arms and means for horizontally adjusting the said swing arm in a line radial with the said stud and intersecting the horizontal circular line of movement of the swing arm and radially extending and vertically adjustable means on the said sleeve for stopping each swing arm with point of contact lineal with the center of the sleeve and neck mold, for the hereinbefore specified purpose.

7. In a machine of the type hereinbefore referred to for the manufacture of glass bottles, jars and the like, a rotatable sleeve, arms carried by and intermittently rotatable with the said sleeve, an annular member on the said sleeve arms having notches and each notch an incline at one side, a weight influenced pedal on the machine base and a bolt linked to the said pedal, which bolt between each incline and notch is kept out of contact with the said member by the said pedal and when coming into contact with the said incline acts as a brake for the sleeve, for the hereinbefore specified purpose.

8. In a machine of the type hereinbefore referred to for the manufacture of glass bottles, jars and the like, a rotatable sleeve, arms carried by the said sleeve, a stud in each of the said sleeve arms, a swing arm pivoted to each of the said studs, and a finishing mold table on each of the said swing arms, the said stud being screw-threaded at the lower end and carrying two nuts to bear against the said sleeve arm for the vertical adjustment of the said stud with the swing arm and finishing mold table thereon and the said table being rendered horizontally adjustable on the said swing arm in a line radial with the said stud and intersecting the circular movement of the said swing arm, for the hereinbefore specified purpose.

Signed at Manchester, England, this 15th day of March, 1916.

JAMES HENDERSON STEELE.

Witnesses:
ALFRED BOSSHARDT,
STANLEY E. BRAMALL.

Copies of this patent may be obtained for five cents each, by addressing the "Commissioner of Patents, Washington, D. C."